(12) United States Patent
Zheng et al.

(10) Patent No.: US 11,677,125 B2
(45) Date of Patent: Jun. 13, 2023

(54) BATTERY CELL, BATTERY MODULE, BATTERY PACK, DEVICE USING BATTERY CELL AS POWER SUPPLY, AND METHOD FOR ASSEMBLING BATTERY CELL

(71) Applicant: Contemporary Amperex Technology Co., Limited, Ningde (CN)

(72) Inventors: Yulian Zheng, Ningde (CN); Xiaoping Zhang, Ningde (CN); Peng Wang, Ningde (CN); Zhanyu Sun, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 130 days.

(21) Appl. No.: 17/058,490

(22) PCT Filed: Nov. 25, 2019

(86) PCT No.: PCT/CN2019/120642
§ 371 (c)(1),
(2) Date: Nov. 24, 2020

(87) PCT Pub. No.: WO2021/102636
PCT Pub. Date: Jun. 3, 2021

(65) Prior Publication Data
US 2021/0242549 A1    Aug. 5, 2021

(51) Int. Cl.
*H01M 50/593* (2021.01)
*H01M 50/586* (2021.01)
(Continued)

(52) U.S. Cl.
CPC ......... *H01M 50/593* (2021.01); *H01M 50/15* (2021.01); *H01M 50/172* (2021.01);
(Continued)

(58) Field of Classification Search
CPC ............ H01M 50/593; H01M 50/586; H01M 50/533; H01M 50/547; H01M 50/172; H01M 50/15
See application file for complete search history.

(56) References Cited

U.S. PATENT DOCUMENTS

2016/0099444 A1  4/2016 Park et al.
2018/0114954 A1* 4/2018 Lee ..................... H01M 50/342
(Continued)

FOREIGN PATENT DOCUMENTS

CN  103078067 A  *  5/2013
CN  204102963 U     1/2015
(Continued)

OTHER PUBLICATIONS

EPO machine generated English translation of CN-103078067-A (Year: 2013).*
(Continued)

*Primary Examiner* — Christopher P Domone
*Assistant Examiner* — Kimberly Wyluda
(74) *Attorney, Agent, or Firm* — Sterne, Kessler, Goldstein & Fox P.L.L.C.

(57) ABSTRACT

The present disclosure relates to a battery cell to alleviate the problem of impurities falling into an electrode assembly. Wherein, the battery cell includes: an electrode assembly including a tab and a cell body, wherein the tab is connected to the cell body; a cover plate assembly including an electrode terminal and a cover plate, wherein the electrode terminal is disposed on the cover plate; a connecting sheet connected between the tab and the electrode terminal, the connecting sheet includes a first connecting portion and a second connecting portion, wherein the first connecting portion is connected to the tab, and the second connecting portion is connected to the electrode terminal; an insulating pallet disposed between the cell body and the connecting sheet; and an insulation member disposed between the insulating pallet and the second connecting portion.

16 Claims, 7 Drawing Sheets

(51) Int. Cl.
    *H01M 50/533*    (2021.01)
    *H01M 50/547*    (2021.01)
    *H01M 50/172*    (2021.01)
    *H01M 50/15*     (2021.01)

(52) U.S. Cl.
    CPC ....... *H01M 50/533* (2021.01); *H01M 50/547* (2021.01); *H01M 50/586* (2021.01)

(56) References Cited

U.S. PATENT DOCUMENTS

| | | |
|---|---|---|
| 2018/0166676 A1 | 6/2018 | Xing et al. |
| 2019/0312252 A1 | 10/2019 | Guen |
| 2019/0363316 A1 | 11/2019 | Lee |

FOREIGN PATENT DOCUMENTS

| | | | |
|---|---|---|---|
| CN | 206210861 U | 5/2017 | |
| CN | 208256820 U | 12/2018 | |
| CN | 109314197 A | 2/2019 | |
| CN | 209344216 U | 9/2019 | |
| EP | 2768045 B1 * | 10/2015 | .......... B60L 11/1879 |
| WO | 2018147603 A1 | 8/2018 | |

OTHER PUBLICATIONS

Extended European Search Report issued in European Application No. 19928307.8, dated May 25, 2021, 9 pages.

\* cited by examiner

BATTERY CELL, BATTERY MODULE, BATTERY PACK, DEVICE USING BATTERY CELL AS POWER SUPPLY, AND METHOD FOR ASSEMBLING BATTERY CELL

TECHNICAL FIELD

The present disclosure relates to the field of batteries, and in particular to a battery cell, a battery module, a battery pack, a device using the battery cell as a power supply, and a method for assembling the battery cell.

BACKGROUND

Metal chips are produced during a welding process of a connecting sheet and a top cover. In order to prevent metal chips from falling into an electrode assembly, a common method is to apply glue at a welding position. However, currently, there is no glue in the industry that may completely resist an electrolyte.

SUMMARY

According to one aspect of the embodiments of the present disclosure, the battery cell includes: an electrode assembly including a tab and a cell body, wherein the tab is connected to the cell body; a cover plate assembly including an electrode terminal and a cover plate, wherein the electrode terminal is disposed on the cover plate; a connecting sheet connected between the tab and the electrode terminal, the connecting sheet includes a first connecting portion and a second connecting portion, wherein the first connecting portion is connected to the tab, and the second connecting portion is connected to the electrode terminal; an insulating pallet disposed between the cell body and the connecting sheet; and an insulation member disposed between the insulating pallet and the second connecting portion.

In some embodiments, the insulating pallet and the connecting sheet both abut against the insulation member.

In some embodiments, the insulating pallet includes a body portion and a carrying portion connected to the body portion, wherein the body portion abuts with the cell body, the carrying portion protrudes in a direction of close to the second connecting portion relative to the body portion, and the insulation member is disposed between the carrying portion and the second connecting portion.

In some embodiments, the second connecting portion protrudes in a direction of close to the electrode terminal relative to the first connecting portion, and a first groove is provided on one side of the second connecting portion proximate to the electrode assembly.

In some embodiments, the insulation member covers an open end of the first groove.

In some embodiments, the insulating pallet includes a carrying portion protruding towards the second connecting portion, and the carrying portion and the first connecting portion jointly limit the insulation member.

In some embodiments, the insulation member is disposed within the first groove.

In some embodiments, the insulating pallet includes a carrying portion protruding towards the second connecting portion, the carrying portion projects into the first groove, and the carrying portion and a bottom of the first groove jointly limit the insulation member.

In some embodiments, the insulation member includes foam, rubber cloth, or solid glue.

In some embodiments, the insulation member includes a solid rubber strip or a colloidal object formed by gumming and curing on the insulating pallet.

In some embodiments, the insulating protective member includes a colloidal object formed by gumming and curing on the insulating pallet, and a plurality of second holes are provided on an area of the insulating pallet that is in contact with the insulation member, so as to prevent overflow of glue.

In some embodiments, the insulating pallet further includes an insert portion, which is connected to a side of the body portion, and is farther to the cell body than the body portion, and at least a part of the tab is located between the insert portion and the cell body.

According to one aspect of the embodiments of the present disclosure, a battery module includes the battery cell described above.

According to one aspect of the embodiments of the present disclosure, a battery pack includes the battery module described above.

According to one aspect of the embodiments of the present disclosure, a device using the battery cell described above as a power supply.

According to one aspect of the embodiments of the present disclosure, a method for assembling the battery cell described above, includes: providing a connecting sheet and an electrode assembly, and connecting a first connecting portion of the connecting sheet with a tab of the electrode assembly; providing a cover plate assembly, and connecting a second connecting portion of the connecting sheet with an electrode terminal of the cover plate assembly; providing an insulation member, and disposing the insulation member on one side of the second connecting portion; and providing an insulating pallet, so that the insulation member is disposed between the cell body and the connecting sheet.

According to one aspect of some embodiments of the present disclosure, the battery cell includes an electrode assembly, a cover plate assembly, a connecting sheet, an insulating pallet, and an insulation member. The insulation member is disposed between the insulating pallet and the second connecting portion of the connecting sheet. The insulation member is configured to catch impurities falling from the second connecting portion, thereby preventing short-circuit when the impurities enter the electrode assembly and improving the safety performance of the battery cell.

DETAILED DESCRIPTION OF THE EMBODIMENTS

Next, the technical solution in the embodiments will be explicitly and completely described in combination with the accompanying drawings in the embodiments of the present disclosure. Apparently, the described embodiments are merely part of the embodiments of the present disclosure, rather than all the embodiments. On the basis of the embodiments of the present disclosure, all the other embodiments acquired by a person skilled in the art on the premise that no inventive effort is involved fall into the scope protected by the present disclosure.

In the description of the present disclosure, it is necessary to understand that, the azimuth or positional relations indicated by the terms "center", "transverse", "longitudinal", "front", "rear", "left", "right", "up", "down", "vertical", "horizontal", "top", "bottom", "within", "outside", which are based on the azimuth or positional relations illustrated by the drawings, are only for facilitating description of the present disclosure and simplifying the description, rather than indicating or implying that the device or element referred thereto has to present a particular azimuth, and be constructed and operated in a particular azimuth, so that it cannot be understood as limiting the protection scope of the present disclosure.

The present disclosure provides a battery cell, a battery module, a battery pack, a device using the battery cell as a power supply, and a method for assembling the battery cell to alleviate the problem of impurities falling into an electrode assembly.

Figure 1:
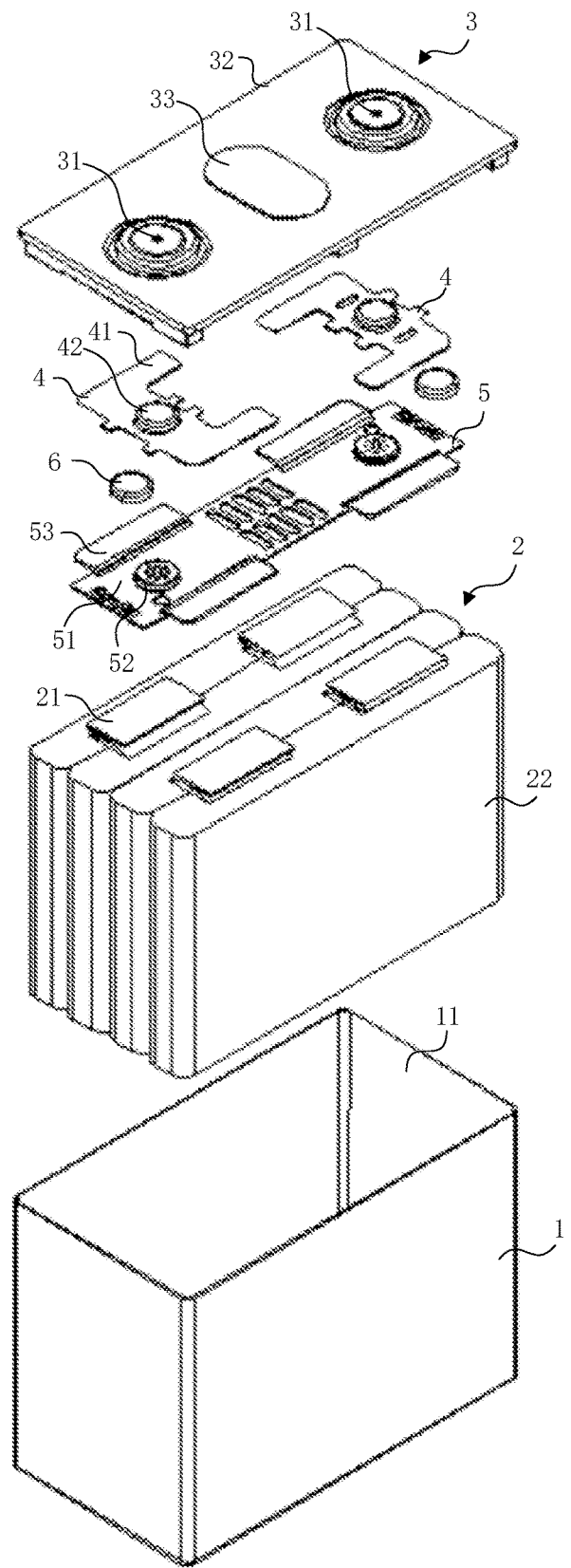
FIG. 1 is an exploded schematic view of a battery cell provided according to some embodiments of the present disclosure.

As shown in FIG. 1, in some embodiments, a battery cell is provided. The battery cell includes a housing 1, an electrode assembly 2, a cover plate assembly 3, a connecting sheet 4, an insulating pallet 5, and an insulation member 6.

The housing 1 is formed with a cavity 11, and the housing 1 has an open end. The electrode assembly 2 is disposed within the cavity 11. The cover plate assembly 3 is located at the open end of the housing 1 and covers the electrode assembly 2, so as to enclose the electrode assembly 2 within the housing 1. The connecting sheet 4 is disposed between the cover plate assembly 3 and the electrode assembly 2 and configured to direct the electricity produced by the electrode assembly 2 to the cover plate assembly 3. Some parts of the insulating pallet 5 are disposed between the cover plate assembly 3 and the electrode assembly 2, while other parts of the insulating pallet 5 are disposed between the connecting sheet 4 and the electrode assembly 2. The insulation member 6 is disposed between the insulating pallet 5 and the connecting sheet 4.

The electrode assembly 2 includes a tab 21 and a cell body 22, wherein the tab 21 is connected to the cell body 22.

The cell body 22 includes a positive pole piece, a negative pole piece, and a diaphragm. Both the positive pole piece and the negative pole piece include an application area. The active substance of the positive pole is applied to the application area of the positive pole piece, and the active substance of the negative pole is applied to the application area of the negative pole piece. The diaphragm is an insulator disposed between the positive pole piece and the negative pole piece. The diaphragm is configured to space apart the application area of the positive pole piece from the application area of the negative pole piece. The positive pole piece, the diaphragm, and the negative pole piece are sequentially stacked and wound to form the cell body 22.

The tab 21 includes a positive pole tab and a negative pole tab. The end of the positive pole piece has a blank area not applied by the active substance of the positive pole, and a plurality of blank areas of the positive pole piece are connected together to form the positive pole tab of the electrode assembly 2. The end of the negative pole piece has a blank area not applied by the active substance of the negative pole, and a plurality of blank areas of the negative pole piece are connected together to form the negative pole tab of the electrode assembly 2.

Optionally, the material of the positive pole piece includes aluminum foil. The material of the negative pole piece includes copper foil.

Optionally, the active substance of the positive pole piece includes lithium cobaltate. The active substance of the negative pole piece includes silicon.

The cover plate assembly 3 is located at the open end of the housing 1 and covers the electrode assembly 2, so as to enclose the electrode assembly 2 within the housing 1. The cover plate assembly 3 includes an electrode terminal 31 and a cover plate 32. The electrode terminal 31 is provided on the cover plate 32. The cover plate 32 is configured to hermetically connect with the housing 1, so as to enclose the electrode assembly 2 within the housing 1.

Figure 7:
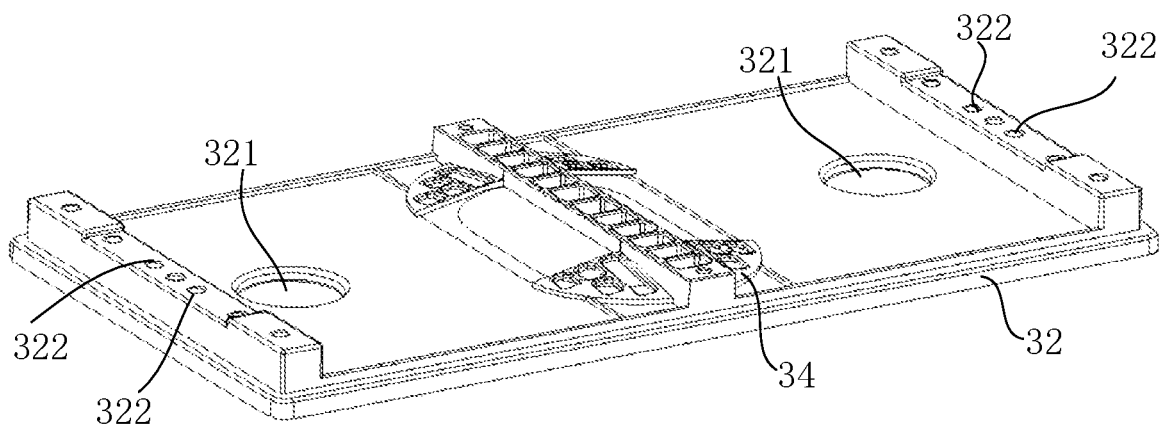
FIG. 7 is a schematic view of a cover plate provided according to some embodiments of the present disclosure.

As shown in FIG. 7, the cover plate 32 is provided with two first holes 321 at intervals. The electrode terminal 31 includes a positive electrode terminal and a negative electrode terminal. The positive electrode terminal passes through one of the two first holes 321, and the negative electrode terminal passes through the other of the two first holes 321. The positive electrode terminal is conductive in correspondence with the positive pole tab, and the negative electrode terminal is conductive in correspondence with the negative pole tab.

As shown in FIG. 1, the cover plate 32 is also provided with an explosion-proof valve 33. Optionally, the explosion-proof valve 33 is disposed between the positive electrode terminal and the negative electrode terminal.

Since a chemical substance, such as an electrolyte, is injected into the housing 1 of the battery cell, a large amount of mixed gas and liquid may be produced during the charging and discharging process, which causes that a pressure is continuously accumulated inside the housing 1 and it is extremely likely that explosion occurs. In the present disclosure, the cover plate 32 is provided with an explosion-proof valve 33. When there is an excessive internal pressure of the battery cell, the explosion-proof valve 33 is opened, so that the mixed gas and liquid produced by charging and discharging are rapidly discharged through the explosion-proof valve 33, thereby preventing explosion due to an excessive internal pressure of the battery cell.

Optionally, the cover plate 32 is configured to a flat plate shape.

Figure 5:
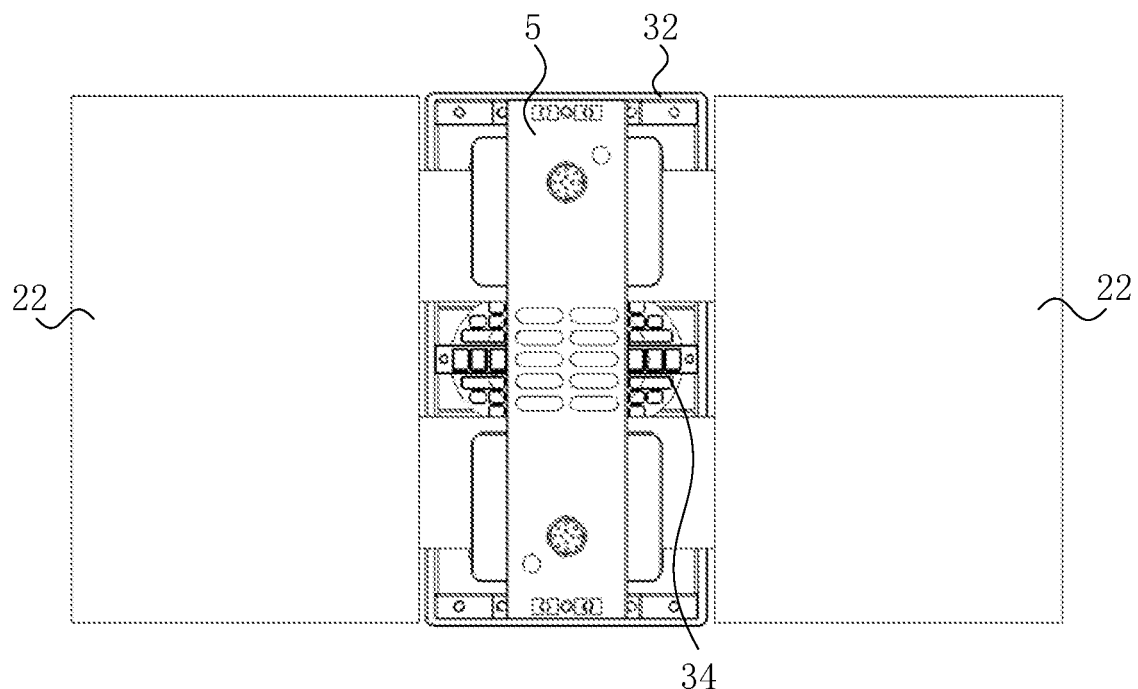
FIG. 5 is a deployed schematic view of a battery cell during assembly provided according to some embodiments of the present disclosure.

In some embodiments, as shown in FIGS. 5 and 7, the cover plate assembly 3 further includes an insulating member 34, which is disposed between the cover plate 32 and the cell body 22, thereby preventing occurrence of short-circuit when the cover plate 32 is in contact with the cell body 22.

Figure 2:
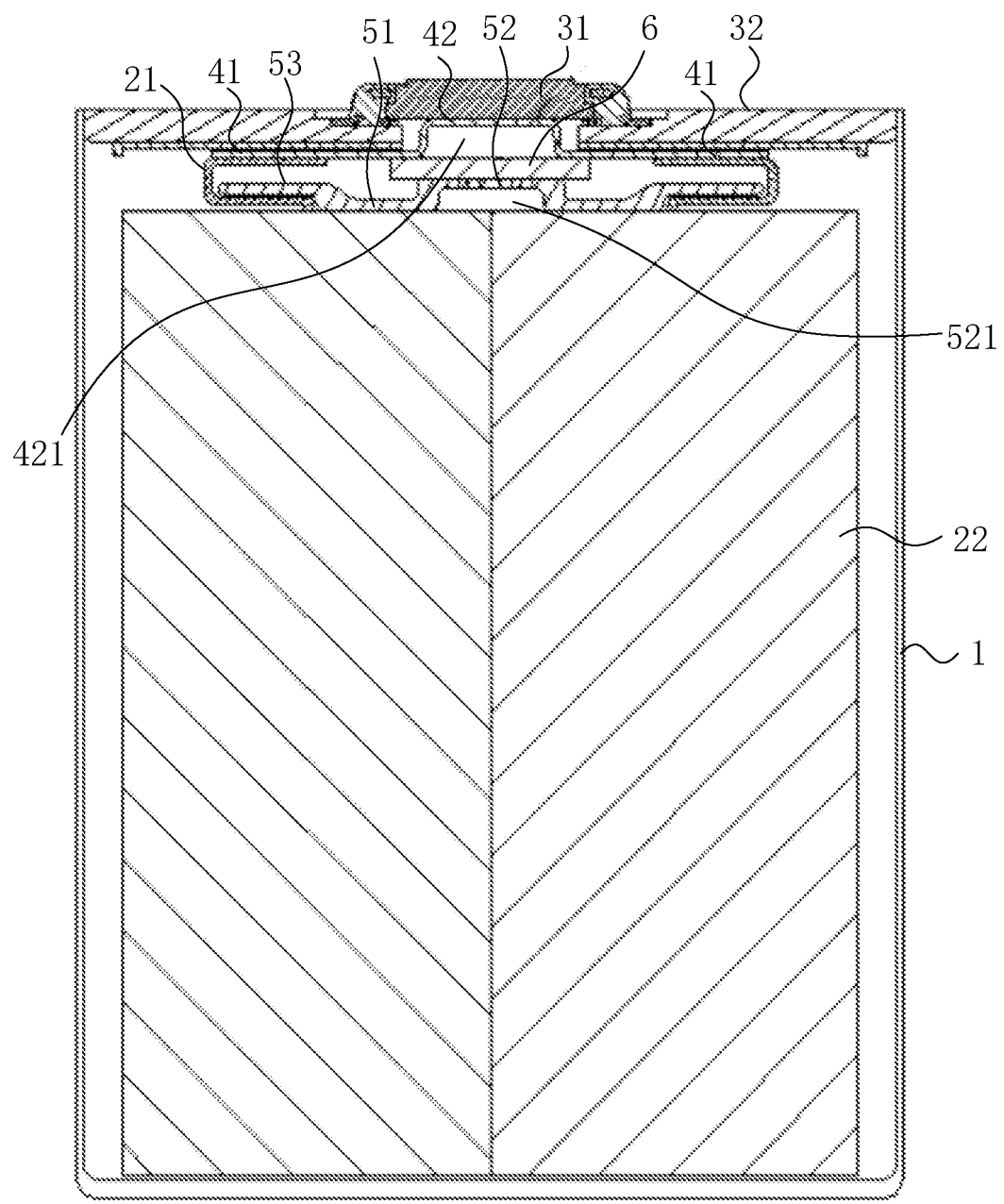
FIG. 2 is a schematic cross-sectional view of a battery cell provided according to some embodiments of the present disclosure.
Figure 3:
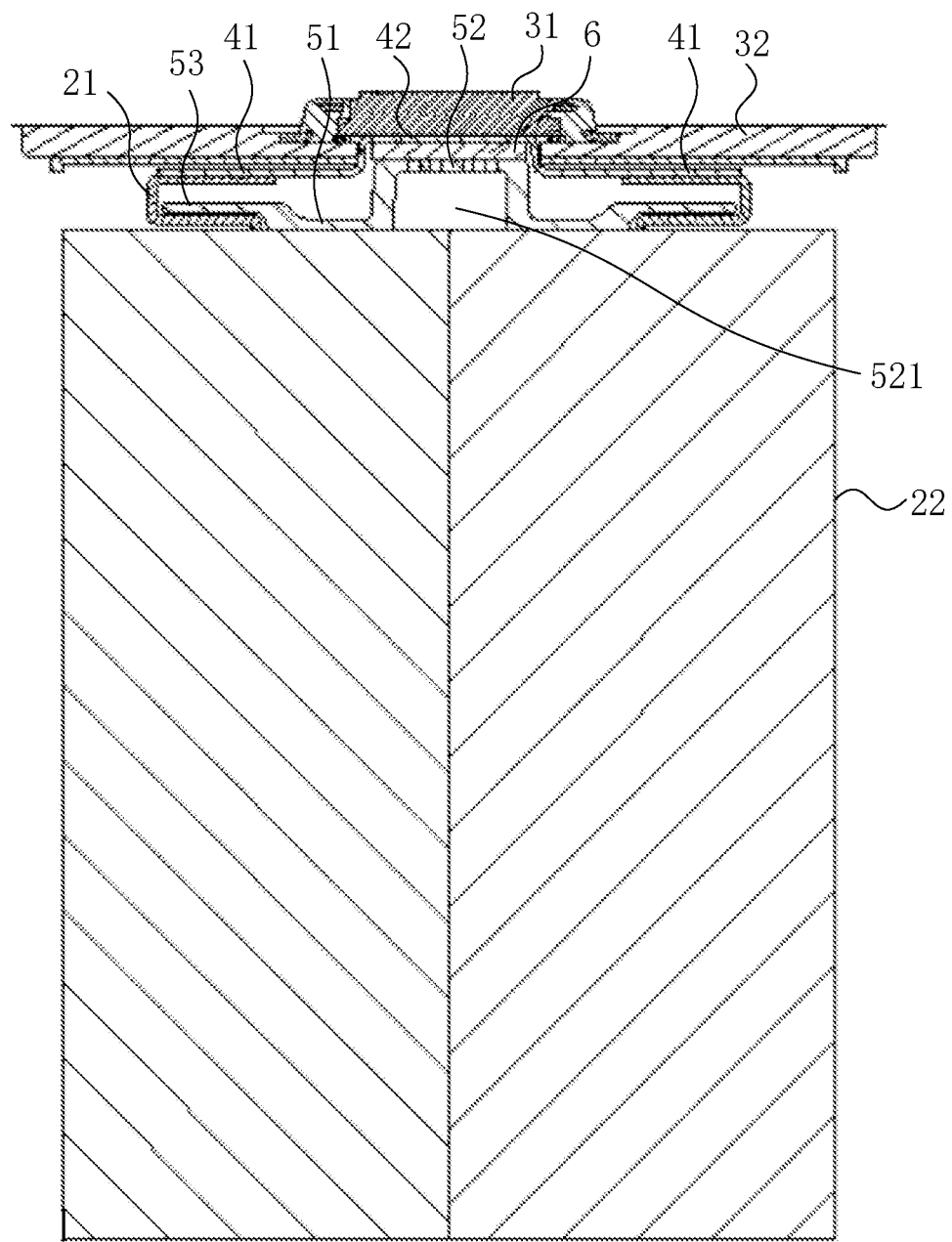
FIG. 3 is a schematic cross-sectional view of a battery cell provided according to other embodiments of the present disclosure.

As shown in FIGS. 1 to 3, the connecting sheet 4 is connected between the tab 21 and the electrode terminal 31.

The connecting sheet 4 is formed of a conductive material and configured to connect the conductive tab 21 with the electrode terminal 31.

The connecting sheet 4 includes a first connecting portion 41 and a second connecting portion 42. The first connecting portion 41 is connected to the tab 21, and the second connecting portion 42 is connected to the electrode terminal 31.

The second connecting portion 42 protrudes in a direction of close to the electrode terminal 31 relative to the first connecting portion 41, and the second connecting portion 42 is provided with a first groove 421 at one side proximate to the electrode assembly 2.

Optionally, the first connecting portion 41 is configured to a flat plate shape.

The first connecting portion 41 of the connecting sheet 4 is connected to the tab 21, and other parts of the connecting sheet 4 than the first connecting portion 41 is spaced apart from the cell body 22 by the insulating pallet 5, so as to prevent occurrence of short-circuit. The second connecting portion 42 of the connecting sheet 4 is connected to the electrode terminal 31.

Since the tab 21 includes a positive pole tab and a negative pole tab, and the electrode terminal 31 includes a positive electrode terminal and a negative electrode terminal, one connecting sheet 4 is provided between the positive electrode terminal and the positive pole tab so as to conduct the positive electrode terminal with the positive pole tab, and another connecting sheet 4 is provided between the negative electrode terminal and the negative pole tab so as to conduct the negative pole tab with the negative electrode terminal.

Some parts of the insulating pallet 5 are disposed between the cell body 22 and the connecting sheet 4. The insulating pallet 5 spaces the connecting sheet 4 apart from the cell body 22 so that the connecting sheet 4 is connected to the cell body 22 through the tab 21 rather than that the connecting sheet 4 is directly connected to the cell body 22, thereby avoiding short-circuit when the connecting sheet 4 is directly connected to the cell body 22.

Other parts of the insulating pallet 5 are located between the cover plate assembly 3 and the cell body 22, and configured to implement isolating the cover plate assembly 3 from the cell body 22, so that the cover plate assembly 3 is connected to the cell body 22 through the electrode terminal 31, the connecting sheet 4 and the tab 21, rather than that the cover plate assembly 3 is directly connected to the cell body 22, thereby avoiding short-circuit when the cover plate assembly 3 is directly connected to the cell body 22.

The insulation member 6 is disposed between the insulating pallet 5 and the second connecting portion 42 of the connecting sheet 4.

Since there is a need to use laser welding during the assembly process of the battery cell, impurities (e.g. metal chips) may be produced during the laser welding process. At the same time, during the assembly process, foreign impurities might also fall into the first groove 421 of the second connecting portion 42. When the battery cell vibrates, impurities on the second connecting portion 42 might fall into the electrode assembly 2, thus causing a short-circuit risk. Therefore, if the insulation member 6 is disposed between the insulating pallet 5 and the second connecting portion 42 of the connecting sheet 4, even if impurities of the second connecting portion 42 fall, they may also be caught by the insulation member 6, thereby avoiding short-circuit when impurities enter the electrode assembly 2, and improving the safety performance of the battery cell.

In a normal placement state of the battery cell, the insulation member 6 is pressed against the insulating pallet 5 due to a gravitational effect, and there might be a gap between the connecting sheet 4 and the insulation member 6. In order to prevent shaking or misplacement of the insulation member 6 due to vibration of the battery cell, and improve the positional stability of the insulation member 6, the insulating pallet 5 and the connecting sheet 4 both abut against the insulation member 6.

As shown in FIGS. 2 and 3, the insulating pallet 5 includes a body portion 51 and a carrying portion 52 connected to the body portion 51. The body portion 51 abuts with the cell body 22, and the carrying portion 52 protrudes in a direction of close to the second connecting portion 42 relative to the body portion 51. The insulation member 6 is disposed between the carrying portion 52 and the second connecting portion 42. Impurities falling from the second connecting portion 42 may be caught by the insulation member 6, thereby avoiding short-circuit when impurities enter the electrode assembly 2 and improving the safety performance of the battery cell.

Optionally, the body portion 51 is configured to a flat plate shape.

In some embodiments, as shown in FIG. 2, the insulation member 6 covers the open end of the first groove 421. The carrying portion 52 and the first connecting portion 41 jointly limit the insulation member 6.

Optionally, both the carrying portion 52 and the first connecting portion 41 abut against the insulation member 6. Furthermore, an area where the first connecting portion 41 is connected to a circumferential side wall of the first groove 421 abuts against the insulation member 6.

In other embodiments, as shown in FIG. 3, the insulation member 6 is disposed within the first groove 421. The carrying portion 52 projects into the first groove 421, and the carrying portion 52 and the bottom of the first groove 421 jointly limit the insulation member 6.

Optionally, both the carrying portion 52 and the bottom of the first groove 421 abut against the insulation member 6.

In some embodiments, as shown in FIGS. 2 and 3, the insulating pallet 5 further includes an insert portion 53, which is connected to a side of the body portion 51, and is farther to the cell body 22 than the body portion 51. At least a part of the tab 21 is located between the insert portion 53 and the cell body 22. The insert portion 53 is provided to prevent short-circuit when the tab 21 is inserted into the cell body 22.

Optionally, the insert portion 53 is connected to the body portion 51 through a transition section, and the surface of the insert portion 53 is parallel to that of the body portion 51. Furthermore, the surface of the insert portion 53, the surface of the body portion 51, and the surface of the carrying portion 52 are all parallel to each other.

Figure 4:
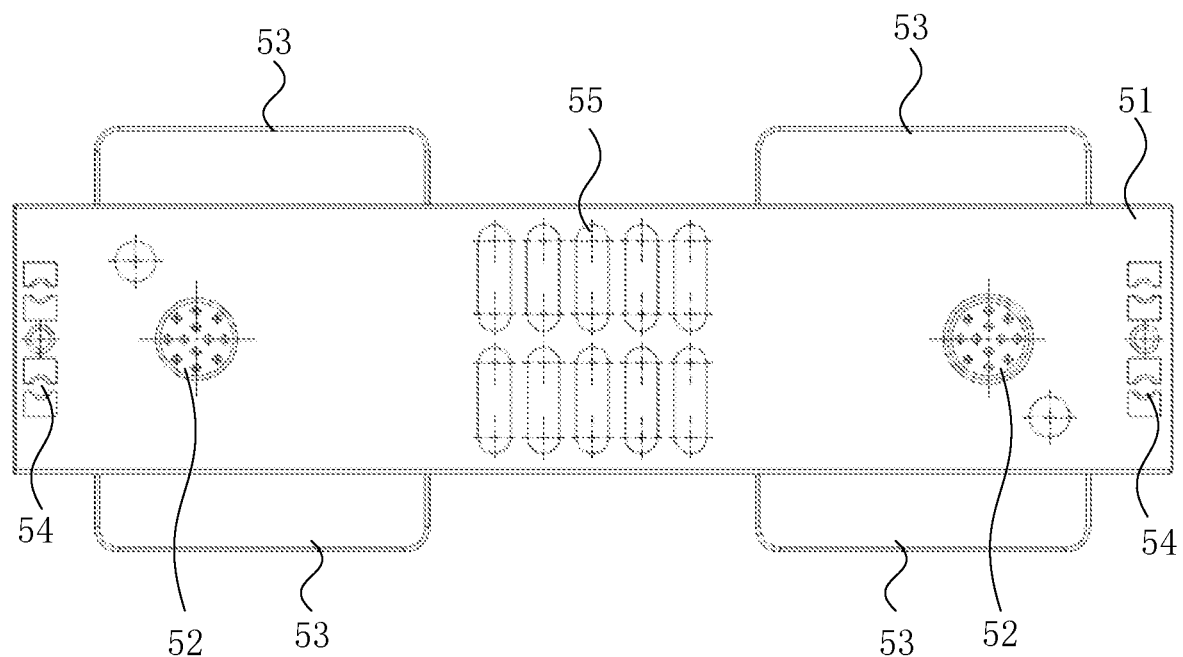
FIG. 4 is a schematic view of an insulating pallet provided according to some embodiments of the present disclosure.
Figure 6:
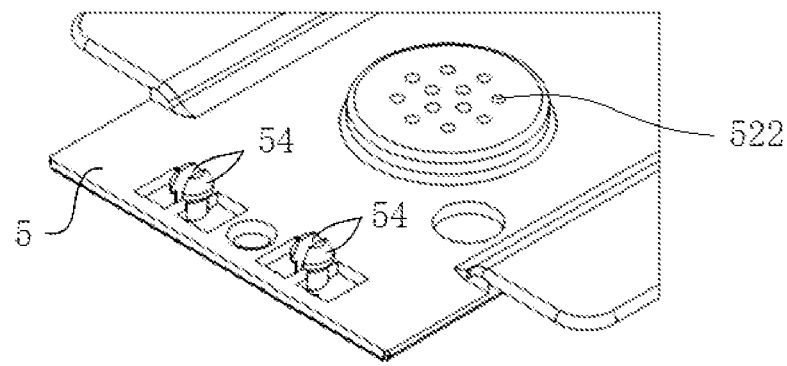
FIG. 6 is a partially enlarged schematic view of an insulating pallet provided according to some embodiments of the present disclosure.

As shown in FIGS. 4 and 6, the insulating pallet 5 is further provided with a hook 54 extending in the direction towards the cover plate assembly 3. As shown in FIG. 7, the cover plate 32 is provided with a slot 322. The cover plate 32 is connected to the housing 1 in an enclosed manner, and the hook 54 on the insulating pallet 5 is connected to the slot 322 on the cover plate 32.

Optionally, the hook 54 is disposed on the body portion 51 and located at an end portion of the insulating pallet 5. Since the body portion 51 is proximate to the cell body 22 relative to the carrying portion 52 and the insert portion 53, the body portion 51 is provided with a hook 54 extending towards the cover plate assembly 3, and the space between the body portion 51 of the insulation plate 5 and the cover plate assembly 3 is subtly utilized without increasing the thickness of the insulation plate 5, and it is also unnecessary to individually provide a connecting sheet to connect the insulating pallet 5 with the cover plate assembly 3, so that the structure is simple and the installation is convenient.

The insert portion 53 of the insulating pallet 5 isolates the tab 21 from the cell body 22 and is fixed to the cover plate assembly 3, so as to ensure that the tab 21 and the cell body 22 are sufficiently spaced apart, thereby preventing a short-circuit risk when the tab 21 is inserted into the cell body 22.

As shown in FIG. 4, the insulating pallet 5 is also provided with a vent hole 55. The vent hole 55 is configured to expel the gas or liquid produced by the battery assembly 2, and also configured to inject an electrolyte into the battery assembly 2, and there is also a function of lessening the weight of the insulating pallet 5.

In some embodiments, at least two rows of vent holes 55 are provided in the insulating pallet 5, with at least two vent holes for each row of vent holes.

As shown in FIG. 5, in a case where the battery cell includes two battery cell bodies 22, the two battery cell bodies 22 are respectively disposed on both sides of the insulating pallet 5, and each of the battery cell bodies 22 is connected to the tab 21. An insert portion 53 is provided on both sides of the insulating pallet 5. Wherein, at least a part of the tab 21 corresponding to one of the cell bodies 22 is located between the insert portion 53 on one side of the insulating pallet 5 and the cell body 22, and at least a part of the tab 21 corresponding to the other cell body 22 is between the insert portion 53 on the other side of the insulating pallet 5 and the cell body 22.

The body portion 51 of the insulating pallet 5 abuts with the cell body 22, and two insert portions 53 are respectively provided on two opposite sides of the body portion 51, to form a wing-like shape, thereby preventing that the body portion 51 is pressed against the tab 21 and enabling to avoid that the insulating pallet 5 is too thick.

In some embodiments, as shown in FIG. 4, the body portion 51 of the insulating pallet 5 is configured to a strip shape, and two carrying portions 52 are provided at intervals in the length direction of the body portion 51. One connecting sheet 4 is provided above a corresponding position of each carrying portion 52. One insert portion 53 is provided respectively on both sides of the body portion 51 corresponding to the positions where the two carrying portions 52 are located. One catch 54 for connection with the cover plate assembly 3 is provided on both ends of the body portion 51 in the length direction. The vent hole 55 is disposed between the two carrying portions 52.

In some embodiments, the insulation member 6 includes foam, tape, or solid glue.

In some embodiments, the insulation member 6 includes a solid rubber strip.

In some embodiments, the insulation member 6 includes a colloidal object formed by gumming and curing on the insulating pallet 5.

An area of the insulating pallet 5 that is in contact with the insulation member 6, that is, an area where the insulating pallet 5 is gummed, is provided with a plurality of second holes 522, so as to prevent overflow of glue.

Further, as shown in FIG. 6, a plurality of second holes 522 are provided in the carrying portion 52, so as to prevent overflow of glue upon application of glue on the carrying portion 52.

The insulation member 6 which is formed of a soft material deformed adaptively according to the shape of the installation space, so as to be adapted to a narrow space within the battery cell.

In some embodiments, a method for assembling the battery cell described above is provided. The method includes: providing a connecting sheet 4 and an electrode assembly 2, and connecting a first connecting portion 41 of the connecting sheet 4 with a tab 21 of the electrode assembly 2; providing a cover plate assembly 3, and connecting a second connecting portion 42 of the connecting sheet 4 with an electrode terminal 31 of the cover plate assembly 3; providing an insulation member 6, and disposing the insulation member 6 on one side of the second connecting portion 42 remote from the cover plate assembly 3; and providing an insulating pallet 5 so that the insulation member 6 is disposed between the cell body 22 and the connecting sheet 4.

In some embodiments, the step of providing a connecting sheet 4 and an electrode assembly 2 includes: positioning the electrode assembly 2 with the connecting sheet 4 such that the tab 21 is located on a first side of the connecting sheet 4.

The step of providing the cover plate assembly 3 includes: positioning the cover plate assembly 3 with the connecting sheet 4 such that the electrode terminal 31 is located on a second side of the connecting sheet 4.

Wherein, the first side and the second side of the insulation member 6 are opposite sides.

In some embodiments, the step of disposing the insulation member 6 between the cell body 22 and the connecting sheet 4 includes: abutting the insulating pallet 5 with the first side of the insulation member 6, and abutting the connecting sheet 4 with the second side of the insulation member 6, so as to fix the position of the insulation member 6.

As shown in FIG. 5, in a specific embodiment of the battery cell, the method for assembling the battery cell includes: placing the cover plate 32 of the cover plate assembly 3 on an assembly platform; respectively providing the connecting sheet 4 above the positions of the two electrode terminals 33 on the cover plate 32; connecting the second connecting portion 42 of the connecting sheet 4 with the electrode terminal 33; laying flat a cell body 22 on both sides of the cover plate 32 respectively; connecting the first connecting portion 41 of the connecting sheet 4 with the tab 21; providing the insulation member 6 on the second connecting portion 42 of the connecting sheet 4; placing the insulating pallet 5 above the connecting sheet 4 so that the insulation member 6 is disposed between the cell body 22 and the connecting sheet 4.

The cell bodies 22 on both sides of the cover plate 32 are flipped upwards by 90 degrees and combined together, while the tab 21 is folded so that at least a part of the tab 21 is located between the insert portion 53 of the insulating pallet 5 and the cell body 22; removing the above-described assembled members from the assembly platform and placing them within the cavity 11 of the housing 1. The cover plate assembly 3 is located at the open end of the housing 1, and the cover plate 32 is connected with the housing 1 in an enclosed manner, so as to enclose the electrode assembly 2 within the housing 1.

In some embodiments, as shown in FIGS. 5 and 7, an insulating member 34 is further provided between the cover plate 32 and the cell body 22, so as to prevent short-circuit when the cover plate 32 is in contact with the cell body 22.

Figure 8:
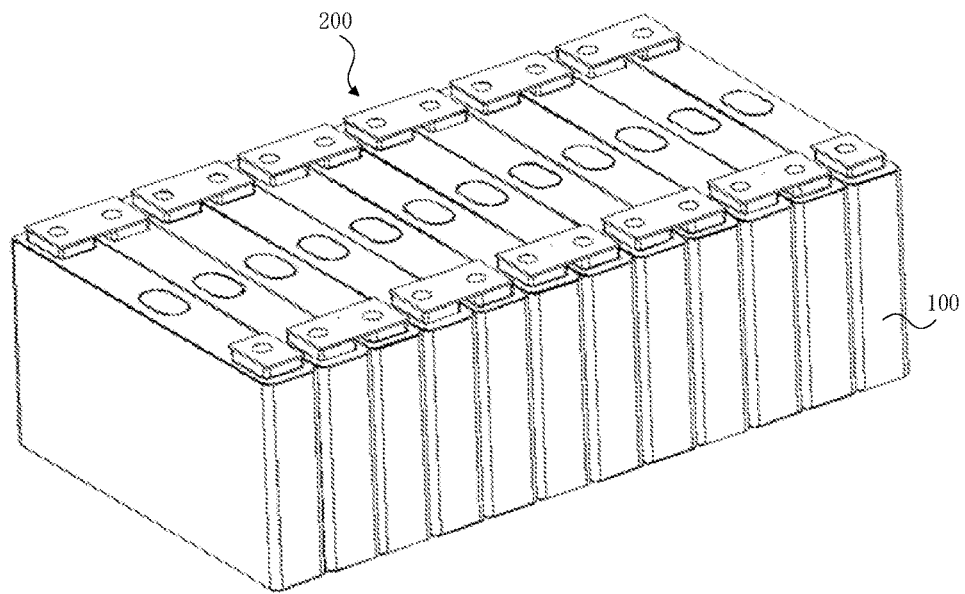
FIG. 8 is a schematic view of a battery module provided according to some embodiments of the present disclosure.

As shown in FIG. 8, in some embodiments, a battery module 200 is provided. The battery module 200 includes the battery cell 100 described above.

The battery module 200 includes a plurality of battery cells 100, at least part of which are connected in series, and at least part of which are connected in parallel.

Figure 9:
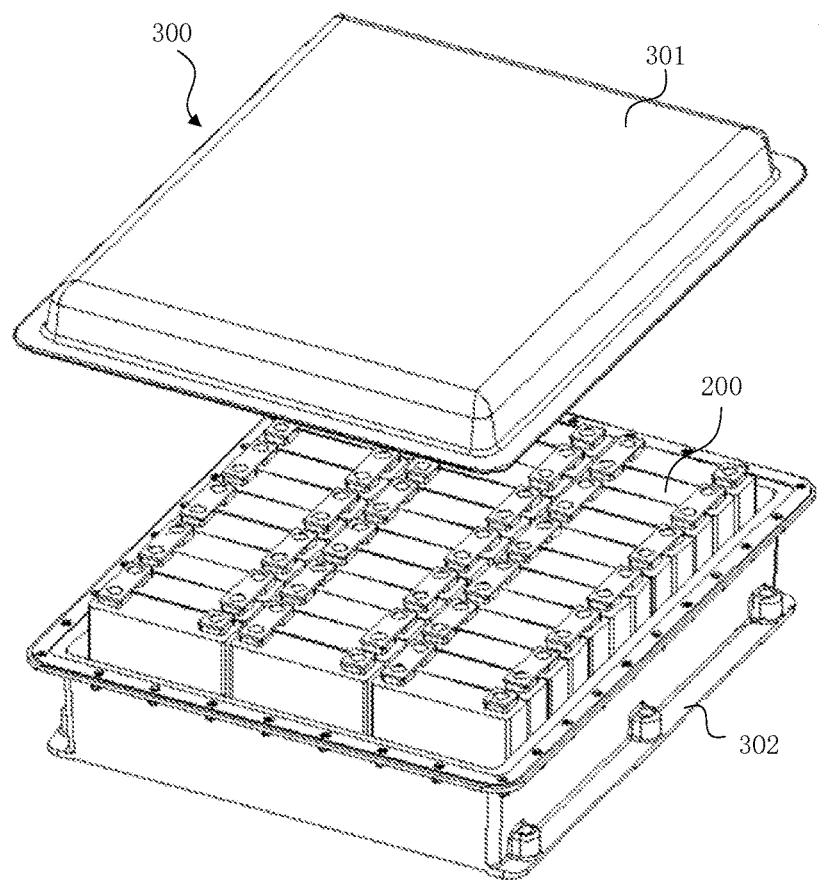
FIG. 9 is a schematic view of a battery pack provided according to some embodiments of the present disclosure.

As shown in FIG. 9, in some embodiments, a battery pack 300 is provided. The battery pack 300 includes the battery module 200 described above.

The battery pack 300 includes a first box cover 301 and a second box cover 302. The first box cover 301 and the second box cover 302 are connected to form an enclosed box. The battery module 200 is provided within the enclosed box formed by the first box cover 301 and the second box cover 302.

The battery pack 300 includes two or more battery modules 200, at least part of which are connected in series, and at least part of which are connected in parallel.

Figure 10:
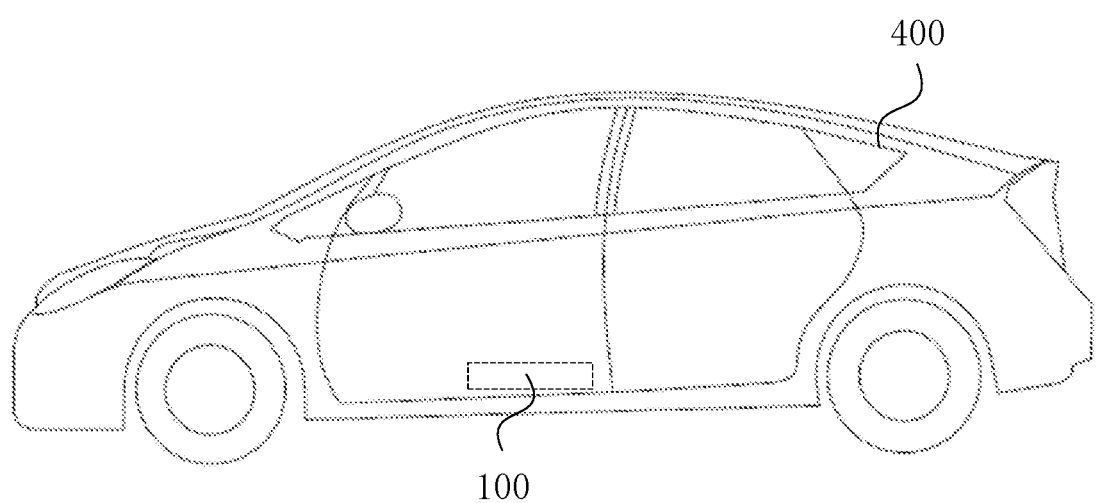
FIG. 10 is a schematic view of a vehicle provided according to some embodiments of the present disclosure.

As shown in FIG. 10, in some embodiments, a device using a battery cell as a power supply is provided. The device includes the battery cell 100 described above.

The devices using a battery cell as a power supply include a vehicle 400, a ship, or the like.

It should be noted that "abutment" between two members in the present disclosure does not mean direct contact, and other members may also be provided between the two members.

In the description of the present disclosure, it is necessary to understand that, such wordings as "first" and "second" which are configured to define the parts, are only intended to facilitate distinguishing the above-described parts. Unless otherwise specified, the aforementioned wordings do not have particular meanings, and thus cannot be understood as limiting the protection scope of the present disclosure.

In addition, without having been explicitly denied, the technical features in one of the embodiments may be advantageously combined with one or more other embodiments.

Finally, it should be explained that: the aforementioned embodiments are only configured to describe the technical solution of the present disclosure rather than limiting the same; although detailed explanations are made to the present disclosure by referring to preferred embodiments, a common technical person in the art should understand that: it is still possible to make amendments to the embodiments of the present disclosure or make equivalent replacements to part of the technical features; without departing from the spirit and scope of the present disclosure, they should all be covered in the scope of the technical solution for which protection is sought in the present disclosure.

What is claimed is:

1. A battery cell, comprising:
    an electrode assembly comprising a tab and a cell body, wherein the tab is connected to the cell body;
    a cover plate assembly comprising an electrode terminal and a cover plate, wherein the electrode terminal is disposed on the cover plate;
    a connecting sheet connected between the tab and the electrode terminal, the connecting sheet comprises a first connecting portion and a second connecting portion, wherein the first connecting portion is connected to the tab, and the second connecting portion is connected to the electrode terminal;
    an insulating pallet disposed between the cell body and the connecting sheet; and
    an insulation member disposed between the insulating pallet and the second connecting portion,
    wherein the insulating pallet comprises a body portion and a carrying portion connected to the body portion, wherein the body portion abuts against the cell body, the carrying portion protrudes in a direction that is closer to the second connecting portion than to the body portion, and the insulation member is disposed between the carrying portion and the second connecting portion.

2. The battery cell according to claim 1, wherein the insulating pallet and the connecting sheet both abut against the insulation member.

3. The battery cell according to claim 1, wherein the second connecting portion protrudes in a direction that is closer to the electrode terminal than to the first connecting portion, and a first groove is provided on one side of the second connecting portion proximate to the electrode assembly.

4. The battery cell according to claim 3, wherein the insulation member covers an open end of the first groove.

5. The battery cell according to claim 4, wherein the insulating pallet comprises a carrying portion protruding towards the second connecting portion, and the carrying portion and the first connecting portion jointly limit the insulation member.

6. The battery cell according to claim 3, wherein the insulation member is disposed within the first groove.

7. The battery cell according to claim 6, wherein the insulating pallet comprises a carrying portion protruding towards the second connecting portion, and the carrying portion projects into the first groove, and the carrying portion and a bottom of the first groove jointly limit the insulation member.

8. The battery cell according to claim 1, wherein the insulation member comprises foam, rubber cloth, or solid glue.

9. The battery cell according to claim 1, wherein the insulation member comprises a solid rubber strip or a colloidal object formed by gumming and curing on the insulating pallet.

10. The battery cell according to claim 9, wherein the insulation member comprises a colloidal object formed by gumming and curing on the insulating pallet, and a plurality of second holes are provided on an area of the insulating pallet that is in contact with the insulation member, so as to prevent overflow of glue.

11. The battery cell according to claim 1, wherein the insulating pallet further comprises an insert portion, which is connected to a side of the body portion, and is farther from the cell body than the body portion, and at least a part of the tab is located between the insert portion and the cell body.

12. A battery module comprising the battery cell according to claim 1.

13. A battery pack comprising the battery module according to claim 12.

14. A device using the battery cell according to claim 1 as a power supply.

15. A method for assembling the battery cell according to claim 1, comprising:
    providing the connecting sheet and an electrode assembly, and connecting a first connecting portion of the connecting sheet with a tab of the electrode assembly;
    providing the cover plate assembly, and connecting a second connecting portion of the connecting sheet with an electrode terminal of the cover plate assembly;
    providing the insulation member, and disposing the insulation member on one side of the second connecting portion; and providing the insulating pallet, so that the insulation member is disposed between the cell body and the connecting sheet.

16. A battery cell, comprising:

an electrode assembly comprising a tab and a cell body, wherein the tab is connected to the cell body;

a cover plate assembly comprising an electrode terminal and a cover plate, wherein the electrode terminal is disposed on the cover plate;

a connecting sheet connected between the tab and the electrode terminal, the connecting sheet comprises a first connecting portion and a second connecting portion, wherein the first connecting portion is connected to the tab, and the second connecting portion is connected to the electrode terminal;

an insulating pallet disposed between the cell body and the connecting sheet; and an insulation member disposed between the insulating pallet and the second connecting portion, wherein the insulation member comprises a colloidal object formed by gumming and curing on the insulating pallet.

* * * * *